United States Patent [19]

Manko et al.

[11] Patent Number: 4,467,944
[45] Date of Patent: Aug. 28, 1984

[54] STORAGE APPARATUS FOR AUTOMOBILE T TOP INSERTS

[76] Inventors: Gene F. Manko, 4125 Clearview Ter., West Palm Beach, Fla. 33409; Henry J. Matrow, III, 4040 Gem Lake Dr., West Palm Beach, Fla. 33406

[21] Appl. No.: 517,078

[22] Filed: Jul. 25, 1983

[51] Int. Cl.³ .............................................. B60R 5/04
[52] U.S. Cl. .......................... 224/42.42; 224/42.45 R; 224/311; 280/769; 296/218
[58] Field of Search ............... 224/42.45 R, 42.42, 224/309, 311, 323, 324; 280/769; 296/218; 248/503

[56] References Cited

U.S. PATENT DOCUMENTS

| | | |
|---|---|---|
| 2,552,293 | 5/1951 | Page et al. ........................ 224/42.1 |
| 3,376,614 | 4/1968 | Stahl, Jr. ................................ 24/81 |
| 4,189,056 | 2/1980 | Majewski ..................... 224/42.42 X |
| 4,225,069 | 9/1980 | Breitschwerdt et al. ........... 224/328 |
| 4,226,348 | 10/1980 | Dottor et al. .................... 224/42.42 |

Primary Examiner—Steven M. Pollard
Attorney, Agent, or Firm—Robert C. Podwil

[57] ABSTRACT

A rack for automobile T top inserts provides a cavity within which a pair of inserts are received and clamped, and the rack is anchored to a floor portion of a vehicle.

16 Claims, 4 Drawing Figures

STORAGE APPARATUS FOR AUTOMOBILE T TOP INSERTS

BACKGROUND OF THE INVENTION

This invention relates to storage apparatus for automobile T top inserts, and more particularly, to storage apparatus in the nature of a rack which may be used to safely and securely store automobile T top inserts.

So-called "T tops" are design features of numerous automobiles.

The roof of an automobile equipped with a T top consists of a fixed structure which typically includes a central rail or bar, extending longitudinally with respect to the vehicle from a rear portion of the roof to the area of the windshield. On either side of the bar, in areas above the doors and windows, are inserts which may be physically removed from the roof when desired, to open substantially the entire roof (with the exception of the longitudinally extending central bar). The inserts may be of metal like the remainder of the roof, or may, as in some instances, consist of a metal frame and a transparent or translucent plastic panel.

Because the inserts are physically separable from the remainder of the automobiles structure, and must, when installed as part of the roof, mate precisely with the fixed structure, they require care in handling and storage. In conventional practice, a vehicle equipped with a T top is provided with sturdy and somewhat cumbersome vinyl sleeves, into which the T top inserts are intended to be placed when removed from the roof. Because the insertion of the inserts into the sleeves involves a certain degree of manipulation and skill, it is easy to neglect to use the sleeves, and simply place the inserts unprotected and unsecured in the trunk or cargo area of the vehicle. Even if protected by sleeves, the inserts, are usually subject to shifting within the trunk or cargo area of the vehicle, and are prone to damage due to impact with each other and with the vehicle's structure due to the motion of the vehicle.

The present invention has as its principal object the provision of a simple, effective and easily used storage apparatus, in the nature of a rack, specifically intended for the storage of T top inserts. It is another object of this invention to provide a storage rack for T top inserts which may readily be installed in a vehicle, and readily manipulated to safely and securely hold T top inserts. Still another object of this invention is to provide an inexpensive and mechanically simple storage device for T top inserts.

Other objects will appear hereinafter.

BRIEF DESCRIPTION

The foregoing and other objects of this invention are realized, in a presently preferred form of the invention (which constitutes the best mode contemplated for carrying out the invention) by apparatus which consists of a member, which may be described as a lower body portion, adapted to be coupled to a floor surface of an automobile, and an upper body portion hingedly coupled to the lower body portion. The upper and lower body portions define between them a cavity which has, in cross section, the general contour of a pair of top inserts nested together in head to tail fashion. Thus, in accordance with the invention, the walls of the cavity provide an opposed pair of clamping surfaces, engageable with the top inserts to firmly and securely clamp the inserts against each other and within the apparatus.

Simple, readily manipulable clamps may secure the apparatus in its insert-engaging position, so that the apparatus may be operated quickly, with a bare minimum of manipulation and motion. Simplicity of operation is a particularly attractive aspect of the present invention, and one which tends to encourage its consistent use.

For the purpose of illustrating the invention, there is shown in the drawings a form of the invention which is presently preferred, it being understood, however, that the invention is not limited to the precise arrangements and instrumentalities shown.

DETAILED DESCRIPTION

Figure 1:
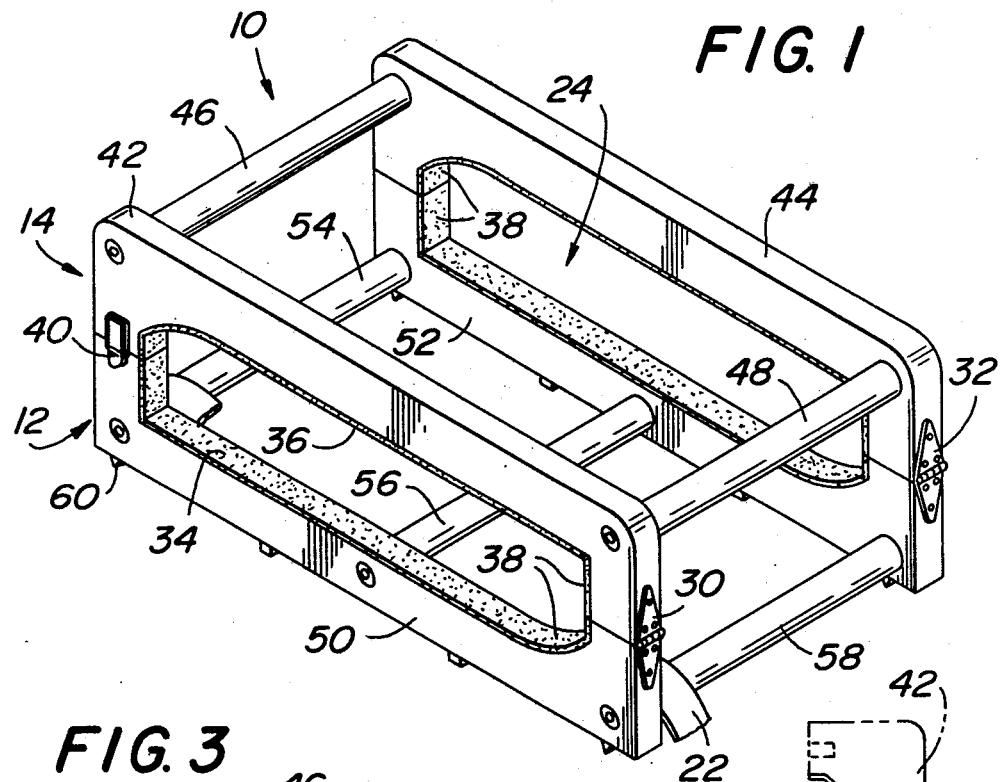
FIG. 1 is a perspective view of a form of apparatus in accordance with the invention.
Figure 4:
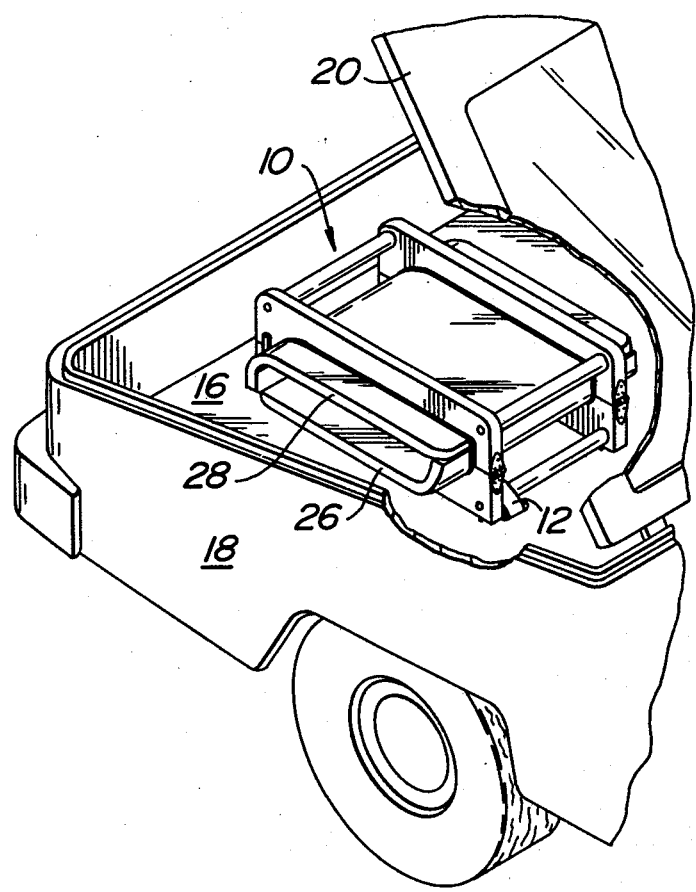
FIG. 4 is a perspective view, showing the apparatus as installed in an automobile.

Referring now to the drawings in detail, wherein like reference numerals indicate like elements, there is seen in FIGS. 1 and 4 a storage apparatus or rack designated generally by reference numeral 10.

The rack 10 comprises a lower body portion, designated generally by the reference numeral 12, and an upper body portion, designated generally by the reference numeral 14.

As is best seen in FIG. 4, in which the rack 10 is seen as operatively disposed, the lower body portion 12 is anchored to a floor or deck portion 16 of a vehicle 18. As illustrated in FIG. 4, the vehicle 18 has a body style known universally as a "hatchback" or "lift-back" construction, and the floor or deck portion 16 is an area of a cargo and storage deck disposed beneath a hatch 20. In some vehicles, cargo tie-down straps, such as the straps 22 seen in FIG. 4, are provided in this area. Such straps provide a convenient means for anchoring the rack 10 to the floor or deck portion 16.

Referring now to FIG. 1, the lower and upper body portions 12 and 14 of the rack 10 are operatively interconnected, and define between them a cavity designated generally by the reference numeral 24.

Figure 2:
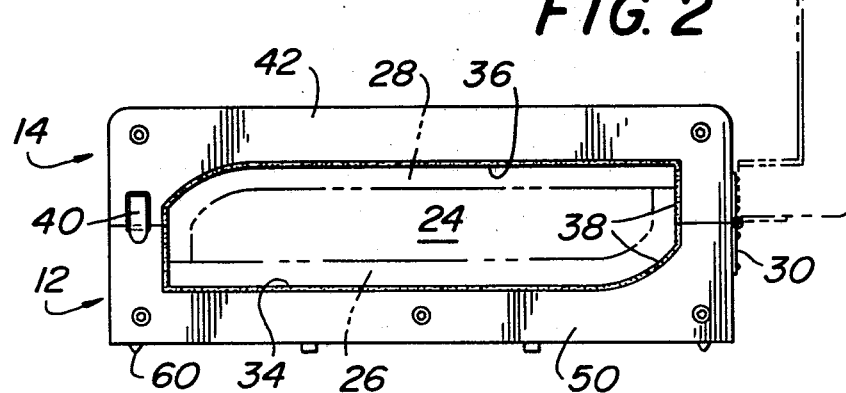
FIG. 2 is a side elevation view of the apparatus shown in FIG. 1, depicting in phantom, the manner in which top inserts may be associated with the apparatus.

As is perhaps best seen in FIG. 2, the cavity 24 has, in cross sectional contour, the general shape of a pair of top inserts 26 and 28, nested together in what may conveniently be referred to as "head to tail" fashion. The cavity 24, it will be appreciated, need not conform exactly to the cross section of the top inserts 26 and 28, although it is preferable that it does so. If desired, the cavity can be made to conform only generally to the cross section, the body portions providing a series of spaced lands or projections which engage the top inserts at spaced points.

In the embodiment of the storage apparatus 10 illustrated in the drawings, the operative association between the lower body portion 12 and upper body portion 14 is achieved by hinged engagement between the body portions. Thus, hinges 30 and 32 permit the upper body portion 14 to pivot with respect to the lower body portion 12 to approximately the position shown in FIG. 2. With the upper body portion 14 thus positioned, a top insert 26 may be cradled on upwardly facing surfaces 34 of the lower body portion 12. Next, the top insert 28 may be placed over the top insert 26 in head to tail position, and the upper body portion 14 rotated down to the closed position best seen in FIGS. 1 and 4 and in the solid line portions of FIG. 2.

The upper body portion 14, it will be seen, has downwardly facing surfaces 36, disposed, when the lower body portion 12 and upper body portion 14 are operatively disposed, in contraposition to the upwardly facing surfaces 36 on the lower body portion 12. The surfaces 34 and 36 are preferably provided with a soft, resilient padding 38, such as, for example, of closed-cell polymeric foam. Other suitable materials can of course be used.

With the top inserts 26 and 28 positioned as described above, the upper body portion 14 may be rotated downwardly to the closed position seen in FIGS. 1 and 4 and the solid line portion of FIG. 2. Latches 40, preferably of the over-center type, draw the upper body portion 14 snugly into place, compressing the padding 28 and, in effect, securely clamping the top inserts 26 and 28 within the apparatus 10. When thus positioned, the top inserts 26 and 28 are restrained from random movement against each other or the apparatus 10. They are thus secured and protected by the apparatus 10.

Figure 3:
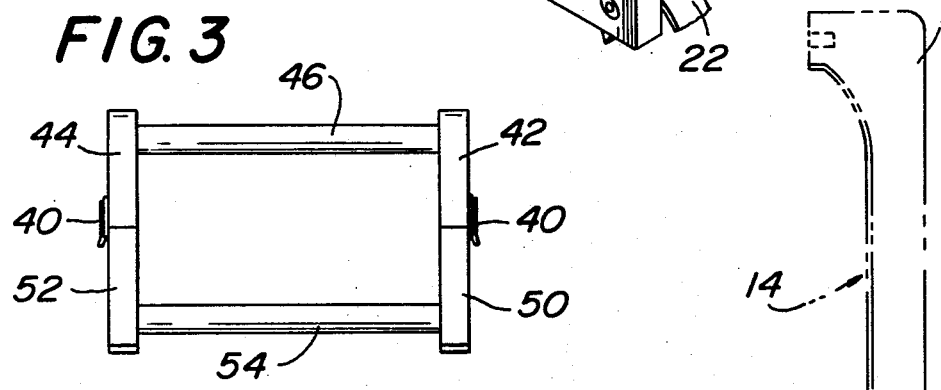
FIG. 3 is an end elevation view of the apparatus shown in FIG. 1.

The lower body portion 12 and upper body portion 14 may advantageously be constructed as depicted in FIGS. 1 through 3, although other specific constructions may occur to those skilled in the art.

In the illustrated embodiment, the lower body portion 12 comprises a pair of spaced generally parallel side members 42 and 44, tied together structurally by a pair of rod members 46 and 48, attached to the side members 42 and 44 by screws or other suitable means. Similarly, the upper body portion 14 comprises a pair of spaced generally parallel side members 50 and 52, tied together structurally by rod members 54, 56 and 58.

In one presently preferred form of the invention, the side members 44, 46, 50 and 52 are made of clear "Lucite" acrylic plastic, one inch in thickness, and the rod members 46, 48, 54, 56 and 58 are Lucite rods of 1¼" diameter.

Feet 60, of Lucite or rubber, help to maintain the position of the apparatus 10 with respect to the floor or deck portion 16. The tie down strap 22 may be passed over the rod members 54, 56, and 58, to hold the apparatus 10 firmly and securely in position in relation to the deck portion 16.

It should be apparent from the foregoing that the rack 10 in accordance with the present invention may readily be installed or removed from a vehicle. Further, it should be apparent that top inserts, such as the top inserts 26 and 28, may be quickly placed in the rack 10, and quickly removed, with just the barest minimum of manipulation of the latches 40 and upper body portion 14. Far less manipulation is required than with conventional storage devices such as the above-mentioned sleeves, and with the present apparatus 10, the top inserts are held under constraint at all times. They are far less prone to damage than when carried within conventional sleeves, loosely stowed in a vehicle.

The present invention may be embodied in other specific forms without departing from its spirit or essential attributes, and, accordingly, reference should be made to the appended claims rather than the foregoing specification as indicating the scope of the invention.

I claim:

1. Storage apparatus for automobile T top inserts, comprising, a lower body portion adapted to be coupled to a floor surface of an automobile, said lower body portion having first cradle means adapted to conform generally to an outer contour of an insert and to supportingly receive an insert, and an upper body portion operatively coupled to said lower body portion and having cradle means associated therewith adapted to conform generally to an outer contour of an insert, said cradle means associated with said upper body portion being disposed in contraposition to said first cradle means when said upper body portion is operatively disposed, and means for securing said upper body portion in operative disposition with respect to said lower body portion.

2. Apparatus in accordance with claim 1, wherein said upper body portion is hingedly interconnected with said lower body portion.

3. Apparatus in accordance with claim 1, wherein said first cradle means and said cradle means associated with said lower body portion define an opposed pair of clamping surfaces, clampingly engageable with a pair of top inserts when said upper and lower body portions are operatively disposed, and means for selectively clampingly interengaging said upper and lower body portions.

4. Apparatus in accordance with claim 3, and hinge means hingedly interconnecting said upper and lower body portions.

5. Apparatus in accordance with claim 4, wherein said clamping surfaces are so configured and arranged as to define a cavity, said clamping surfaces being adapted to clampingly engage a pair of top inserts disposed head to tail in said cavity.

6. Apparatus in accordance with claim 1, wherein said body portions comprise spaced generally parallel side members, and tie means structurally interconnecting said side members.

7. Apparatus in accordance with claim 6, wherein said respective cradle means comprise profiles in said side members conforming generally to the outer contour of an insert.

8. Apparatus in accordance with claim 7, wherein said profiles define a cavity, the walls of said cavity being a pair of clamping surfaces clampingly engageable with a pair of inserts when said upper and lower body portions are operatively disposed, and means for selectively clampingly interengaging said upper and lower body portions.

9. Apparatus in accordance with claim 8, wherein said profiles are so configured and arranged as to be adapted to clampingly engage a pair of top inserts disposed head to tail in said cavity.

10. Apparatus in accordance with claim 9, and said profiles being lined with resilient cushioning material.

11. Apparatus in accordance with claim 9, and foot members disposed on said lower body portion so as to aid in maintaining the position of said apparatus within an automobile.

12. Apparatus in accordance with claim 11, wherein said tie members comprise rod members interconnecting said side members of said upper and lower body portions, said rod members providing means to facilitate anchorage of said apparatus to a floor surface of an automobile.

13. Storage apparatus for automobile T top inserts, comprising a lower body portion adapted to be coupled to a floor surface of an automobile, an upper body portion operatively coupled to said lower body portion, said upper and said lower body portions defining a cavity therebetween, said cavity having, in cross section, the general contour of a pair of top inserts nested together in head to tail fashion, the walls of said cavity defining an opposed pair of clamping surfaces clampingly engageable with said top inserts, and means for selectively clampingly interengaging said upper and lower body portions.

14. Apparatus in accordance with claim 13, wherein said upper and lower body portions are interconnected by hinge means.

15. Apparatus in accordance with claim 14, said cavity being lined with resilient cushioning material, said means for selectively clampingly interengaging said upper and lower body portions comprising a latch, said latch being disposed remote from said hinge means, whereby operation of said latch causes said resilient cushoning material to apply clamping force to top inserts disposed in said cavity.

16. Apparatus in accordance with claim 15, and means on said apparatus to facilitate selective anchorage of said apparatus to a floor surface of an automobile.

* * * * *